United States Patent [19]
Ishijima et al.

[11] Patent Number: 5,905,939
[45] Date of Patent: May 18, 1999

[54] PROCESS FOR PRODUCING CONNECTING ROD

[75] Inventors: Zenzo Ishijima; Junichi Ichikawa; Syuji Sasaki, all of Chiba; Jun Sakai, Tokyo; Hideo Shikata, Chiba; Hideo Urata, Saitama, all of Japan

[73] Assignees: Hitachi Powdered Metals Co., Ltd, Chiba; Honda Giken Kogyo Kabushiki Kaisha, Tokyo, both of Japan

[21] Appl. No.: 08/888,010

[22] Filed: Jul. 3, 1997

[30] Foreign Application Priority Data

Jul. 4, 1996 [JP] Japan .................................. 8-174793

[51] Int. Cl.⁶ .................................. B22F 3/12; B22F 3/24
[52] U.S. Cl. .................................. 419/28; 419/38
[58] Field of Search .................................. 419/38, 28

[56] References Cited

U.S. PATENT DOCUMENTS

| | | | |
|---|---|---|---|
| 5,051,232 | 9/1991 | Summers . | |
| 5,353,500 | 10/1994 | Hoag et al. | 29/888.091 |
| 5,460,776 | 10/1995 | Ackermann et al. | 419/44 |
| 5,536,089 | 7/1996 | Weber et al. | 384/294 |
| 5,551,782 | 9/1996 | Arnhold et al. | 384/294 |
| 5,594,187 | 1/1997 | Lynn | 75/246 |
| 5,666,637 | 9/1997 | Fujiki et al. | 419/27 |
| 5,722,036 | 2/1998 | Shikata et al. | 419/38 |
| 5,799,565 | 9/1998 | Bo | 92/187 |

FOREIGN PATENT DOCUMENTS

0696688A1  2/1996  European Pat. Off. .
39 04 020 A1  8/1990  Germany .

*Primary Examiner*—Daniel J. Jenkins
*Attorney, Agent, or Firm*—Nikaido Marmelstein; Murray & Oram, LLP

[57] ABSTRACT

There is provided a connecting rod including a connecting rod body and a cap having excellent alignment properties, and a method of producing such a connecting rod. A connecting rod body and a cap are produced through the steps of molding green compacts respectively corresponding to the connecting rod body and the cap; sintering and unifying both the green compacts; forging the resultant sintered product in a mold; and fracturing the resultant forged product. The green compact corresponding to the cap and/or the green compact corresponding to the connecting rod body includes opposite circumferential end faces formed with one or more projection. A clearance c is formed between both circumferential end faces of the sintered product due to the projection. With this clearance c, both the circumferential end faces are formed with recesses and projections which are fitted to each other during the forging process and which are relatively large and thus have large biting amounts. During the fracturing process, the recesses and the projections are separated into two pieces.

39 Claims, 14 Drawing Sheets

PROCESS FOR PRODUCING CONNECTING ROD

BACKGROUND OF THE INVENTION

1. Field of the Invention

The present invention relates to a process for producing a connecting rod, and more particularly, to a process for producing a connecting rod which includes a connecting rod body having a larger end-forming semi-annular portion, and a semi-annular cap constituting a larger end in cooperation with the larger end-forming semi-annular portion, the semi-annular cap being abutted at its opposite circumferential end faces respectively against opposite circumferential end faces of the larger end-forming semi-annular portion and mounted to the latter.

2. Description of Related Art

Conventionally, as the above-mentioned process for producing a connecting rod, there is a known process including the steps of placing a sintered product for the connecting rod body and a sintered product for the semi-annular cap in a metal mold such that opposite circumferential end faces of the larger end-forming semi-annular portion of the sintered product for the connecting rod body and opposite circumferential end faces of the sintered product for the semi-annular cap are respectively opposed to each other; subjecting both the sintered bodies to a mold-forging process to provide a forged product including a connecting rod body and a semi-annular cap interconnected to each other; and subjecting the forged product to a fracturing process to provide the connecting rod body and the semi-annular cap which are fractured from each other (see German patent application Laid-open No. 3904020).

Because there exists a large number of voids on both the circumferential end faces of both the sintered bodies, a flow of plasticity of a material into the voids and a deformation of the voids can occur during a mold-forging process, and due to this, a large number of recesses and projections which fit to each other are formed on both the opposed circumferential end faces of the connecting rod body and the semi-annular cap. And by a subsequent fracturing process, these recesses and projections are fractured such as to be bisected into the recesses and projections.

The connecting rod obtained in the above-described manner has a merit in that when it is to be mounted to the semi-annular larger end portion of the semi-annular cap, it is possible to align both the members by fitting the recesses and projections to each other.

In such a conventional process, however, because both the sintered bodies are independent from each other, when they are to be mounted in the metal mold, there is a problem in that such mounting operation must be conducted individually, leading to an inferior workability.

Further, because the recess and projection of both the circumferential end faces are dependent on the voids existing on both the sintered bodies, there are problems in that the recess and projection are minute and their biting amount (biting amount means a height for the projection, and a depth for the recess, and so forth) are small and therefore, it is difficult to align the larger end-forming semi-annular portion and the semi-annular cap to each other and furthermore, both the members are apt to deviate from the right positions because their engaging force is weak.

SUMMARY OF THE INVENTION

It is an object of the present invention to provide a process for producing a connecting rod in which the mounting workability of the sintered product to the metal mold is excellent, and at least one set of the recess and projection which are formed on both the opposed circumferential end faces of the larger end-forming semi-annular portion and the semi-annular cap and which are fitted to each other can be made relatively large and their biting amounts can be made large.

To achieve the above object, according to the present invention, there is provided a process for producing a connecting rod, which comprises a connecting rod body having a larger end-forming semi-annular portion, and a semi-annular cap constituting a larger end portion in cooperation with the larger end-forming semi-annular portion, the semi-annular cap being abutted at its opposite circumferential end faces respectively against opposite circumferential end faces of the larger end-forming semi-annular portion and mounted to the latter, the process comprising the steps of forming a first green compact having a shape similar to that of the connecting rod body, and a second green compact having a shape similar to that of the semi-annular cap, and forming at least one projection on each of the circumferential end faces of the larger end-forming semi-annular portion of the first green compact and/or the circumferential end faces of the semi-annular cap of the second green compact; subjecting both the green compacts to sintering process in a state where the at least one projection on one of the first and second green compacts is abutted against a circumferential end face on the other of the first and second green compacts, thereby providing a sintered product comprising a first sintered portion corresponding to the first green compact and a second sintered portion corresponding to the second green compact, the first and second sintered portions being connected to each other through the projection and formed with a clearance between the circumferential end faces; subjecting the sintered product to a mold-forging process to provide a forged product comprising the connecting rod body corresponding to the first sintered portion and the semi-annular cap corresponding to the second sintered portion, the connecting rod body and the semi-annular cap being connected to each other; and subjecting the forged product to a fracturing process to provide the connecting rod body and the semi-annular cap fractured from each other.

With the above process, because the first and second sintered portions constituting the sintered product are connected to each other through the projection and unified together, a workability for mounting the sintered product to the metal mold is excellent.

Further, a flow of plasticity of a material into the clearance and a deformation of the clearance between the opposed circumferential end faces of the first and second sintered portions occur during a mold-forging process, and due to this, at least one set of recess and projection which fit to each other and are relatively large and thus have large biting amounts are formed on both the opposed circumferential end faces.

Because these recess and projection are fractured such as to be bisected into recess and projection, when the semi-annular cap is mounted to the larger end-forming semi-annular portion, the recess and projection can easily be fitted to each other to easily align the semi-annular cap and the larger end-forming semi-annular portion to each other. Further, because the engaging force between the recess and projection is strong, it is possible to prevent both the members from deviating from the right positions after alignment.

Further, it is an object of the present invention to provide a process for producing a connecting rod in which a workability for mounting the sintered product to the metal mold, and a fracturing workability of the forged products are excellent.

To achieve the above object, according to the present invention, there is provided a process for producing a connecting rod, which comprises a connecting rod body having a larger end-forming semi-annular portion, and a semi-annular cap constituting a larger end portion in cooperation with the larger end-forming semi-annular portion, the semi-annular cap being abutted at its opposite circumferential end faces respectively against opposite circumferential end faces of the larger end-forming semi-annular portion and mounted to the latter, the process comprising the steps of: forming a first green compact having a shape similar to that of the connecting rod body, and a second green compact having a shape similar to that of the semi-annular cap; subjecting both the green compacts to a sintering process in a state where the circumferential end faces of both the green compacts are abutted against each other and where a height difference is produced between semi-annular planes which are adjacent to each other and intersecting the center line of the larger end hole, thereby providing a sintered product comprising a first sintered portion corresponding to the first green compact and a second sintered portion corresponding to the second green compact, the first and second sintered portions being connected to each other through the circumferential end faces; subjecting the sintered product to a mold-forging process for pressing the sintered product in a direction of the center line of the larger end hole to eliminate the height difference and then, providing a forged product comprising the connecting rod body corresponding to the first sintered portion and the semi-annular cap corresponding to the second sintered portion; and subjecting the forged product to a fracturing process to provide the connecting rod body and the semi-annular cap fractured from each other.

Furthermore, according to the present invention, there is provided a process for producing a connecting rod, which comprises a connecting rod body having a rod portion, a larger end-forming semi-annular portion formed integral with the rod portion, the rod portion having a rod axis, and a semi-annular cap constituting a larger end portion in cooperation with the larger end-forming semi-annular portion, the larger end portion defining a larger end hole, the semi-annular cap being abutted at its opposite circumferential end faces respectively against opposite circumferential end faces of the larger end-forming semi-annular portion and mounted to the latter, the process comprising the steps of: forming a first green compact having a shape similar to that of the connecting rod body, and a second green compact having a shape similar to that of the semi-annular cap; subjecting both the green compacts in at least one of a state 1) where the circumferential end faces of the green compacts are abutted against each other and a height difference is produced between outer sides of the green compacts which are adjacent to each other and parallel to the rod axis, and a state 2) where the circumferential end faces of both the green compacts are abutted against each other, and a height difference is produced between circumferential end edges of semi-annular recesses of the first and second green compacts based on a difference in radius between the semi-annular end edges corresponding to the larger end hole, thereby providing a sintered product comprising a first sintered portion corresponding to the first green compact and a second sintered portion corresponding to the second green compact which are interconnected with each other through the circumferential end faces; mold-forging the sintered product by pressing the sintered product in a direction of the center line of the larger end hole, moving and/or plastically deforming at least one of the first and second sintered portions in a plane intersecting the center line of the larger end hole when starting the mold-forging process by cooperation of a mold (preferably a metal mold) and a pressing force in the direction of the center line of the larger end hole, thereby eliminating the height difference, and in a subsequent step of the mold forging process, providing a forged product comprising the connecting rod body corresponding to the first sintered portion and the semi-annular cap corresponding to the second sintered portion interconnected with each other; and subjecting the forged product to a fracturing process to provide the connecting rod body and the semi-annular cap fractured from each other.

With the above process, because the first and second sintered portions constituting the sintered product are connected to each other through both the circumferential end faces and unified together, a workability for mounting the sintered product to the mold is excellent.

Further, in the mold-forging process, because the height difference between the first and second sintered portions is eliminated, the sintered sections between the circumferential end faces are fractured or deformed and a large stress is produced. Therefore, in the fracturing process, the connecting rod body and the semi-annular cap can easily be fractured.

In the sintered product having the height difference, it is possible to use one or more projection of the type described above, which makes it possible to allow, at least one set of recess and projection which are formed on the opposed circumferential end faces of the larger end-forming semi-annular portion and the semi-annular cap and fitted to each other, to have a relatively large size and a large biting amount.

The invention may be more fully understood with reference to the accompanying drawings and the following description of the embodiments shown in those drawings. The invention is not limited to the exemplary embodiments and should be recognized as contemplating all modifications within the skill of an ordinary artisan.

BRIEF DESCRIPTION OF THE DRAWING FIGURES

DESCRIPTION OF PREFERRED EMBODIMENTS OF THE INVENTION

Figure 1:
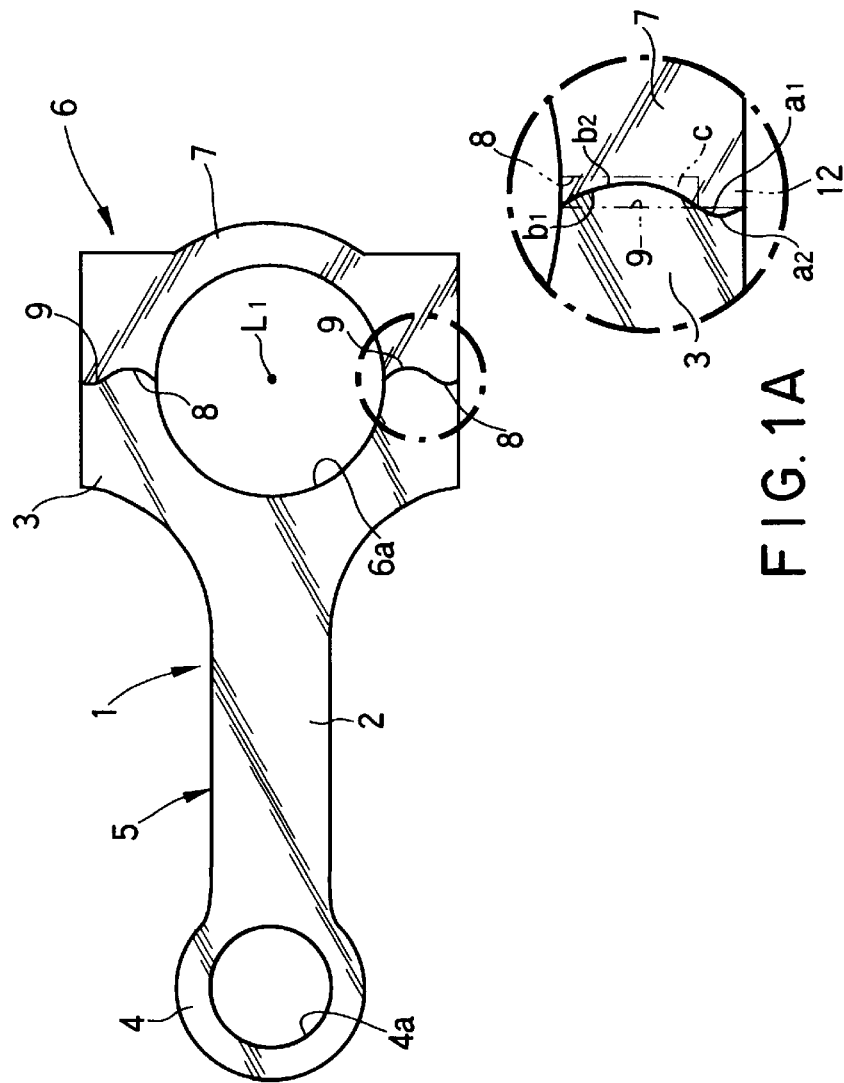
FIG. 1 is an enlarged plan view of an essential portion of a connecting rod.

FIG. 1 shows a connecting rod 1 for use in an internal combustion engine of an automobile. The connecting rod 1 includes: a connecting rod body 5 including a rod portion 2, a larger end-forming semi-annular portion 3 continuously formed at one end of the rod portion 2 and an annular smaller end portion 4 continuously formed at the other end of the rod portion 2 and provided with a smaller end hole 4a; and a semi-annular cap 7 which cooperates with the larger end-forming semi-annular portion 3 to constitute a larger end 6. The semi-annular cap 7 is mounted to the larger end-forming semi-annular portion 3 such that opposite circumferential end faces 8 of the semi-annular cap 7 abut against opposite circumferential end faces 9 of the larger end-forming semi-annular portion 3. Although the drawings do not show, the semi-annular cap 7 is formed at its opposite circumferential ends with insertion holes for mounting bolts, and the larger end-forming semi-annular portion 3 is formed at its opposite circumferential ends with threaded holes for external screws.

As is shown in FIG 1 in an enlarged scale, the opposite circumferential end faces 9 and 8 of the larger end-forming semi-annular portion 3 and the semi-annular cap 7 which face each other respectively include corrugated shapes which fit to each other. Both the opposite circumferential end faces 9 and 8 are formed, at regions thereof in the vicinity of outer sides of the larger end-forming semi-annular portion 3 and the semi-annular cap 7, with a recess portion and a projection portion (in the present embodiment, a stripe recess $a_1$, and a stripe projection $a_2$ parallel to a center line $L_1$ of a larger end hole), and are formed, at regions thereof except the former regions, with a recess portion and a projection portion (in the present embodiment, a stripe recess $b_1$ and a stripe projection $b_2$ parallel to the center line $L_1$ of the larger end hole. The stripe recess $a_1$ and the stripe projection $a_2$ fit to each other, and are larger than those of the prior art and thus have larger biting amounts. The stripe recess $b_1$ and the stripe projection $b_2$ fit to each other, and are larger than the stripe projections $a_1$ and $a_2$ and thus have larger biting amounts.

With this arrangement, when the semi-annular cap 7 is mounted to the larger end-forming semi-annular portion 3, it is possible to easily fit the stripe recesses $a_1$ and $b_1$ to the stripe projections $a_2$ and $b_2$, and to easily align the semi-annular cap 7 and the larger end-forming semi-annular portion 3 to each other. Further, since the stripe recess $a_1$ and $b_1$ have larger biting amounts to the stripe projections $a_2$ and $b_2$ and thus are strongly engaged with each other, it is possible to prevent both the semi-annular cap 7 and the larger end-forming semi-annular portion 3 from deviating from the correct positions after they are aligned to each other.

In producing the connecting rod 1, the following methods are used.

Figure 2:
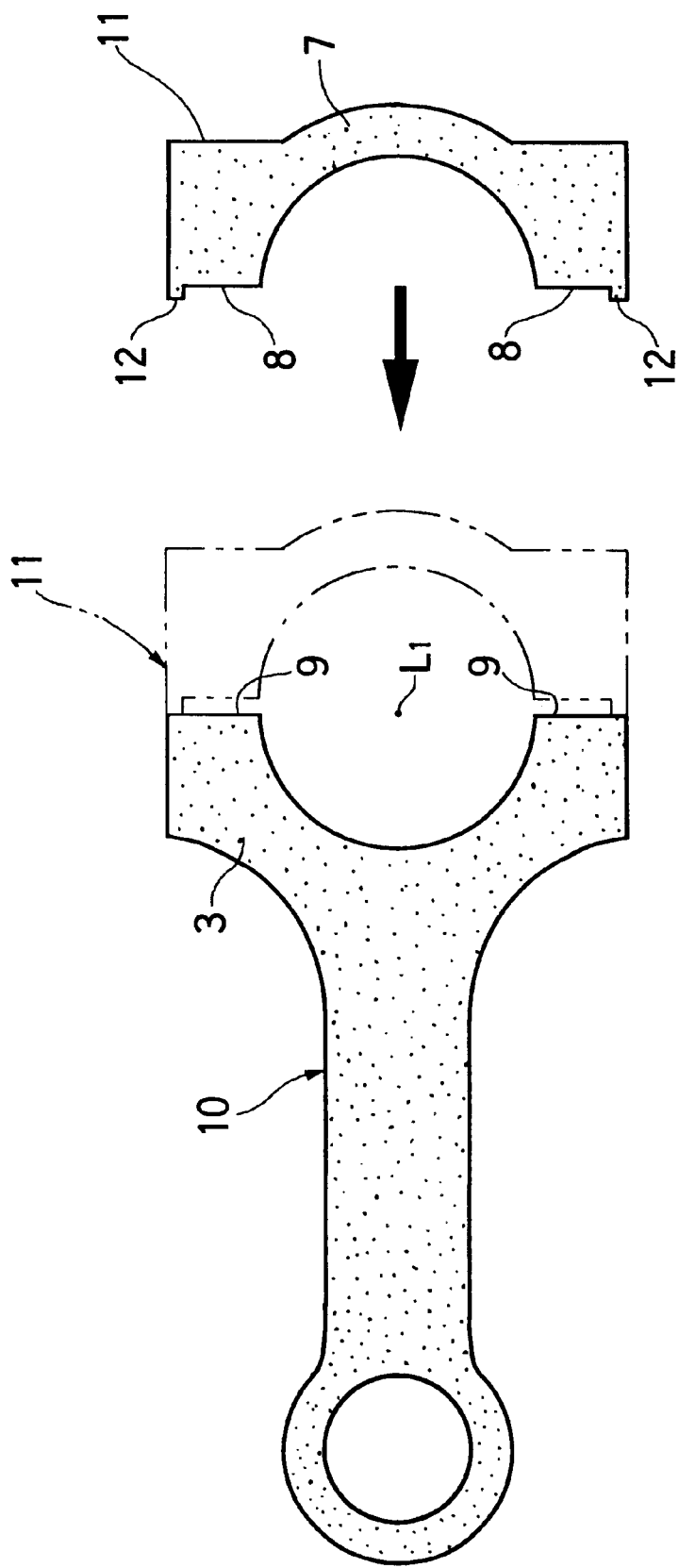
FIG. 2 is a plan view of first and second green compacts according to a first embodiment of the present invention.

(1) a first green compact 10 having a similar shape to that of the connecting rod body 5 and a second green compact 11 having a similar shape to that of the semi-annular cap 7 are formed, as is shown by solid lines in FIG. 2. At that time, at least one projection is formed on each of the opposite circumferential end faces 9 of the larger end-forming semi-annular portion 3 of the first green compact 10, and/or the opposite circumferential end faces 8 (in the present embodiments, the opposite end faces 8) of the second green compact 11.

In FIG. 2, the projection is a stripe projection 12 which is parallel to the center line $L_1$ of the larger end hole and square in cross section, and is located at an outer side edge of each of the circumferential end faces 8. Both the opposite circumferential end faces 9 of the larger end-forming semi-annular portion 3 of the first green compact 10 are formed flatly.

(2) Both the green compacts 10 and 11 are subjected to a sintering treatment in a state where each of the stripe projections 12 is abutted against each of the circumferential end faces 9 of the first green compact 10 as is shown by chained lines in FIG. 2.

Figure 3:
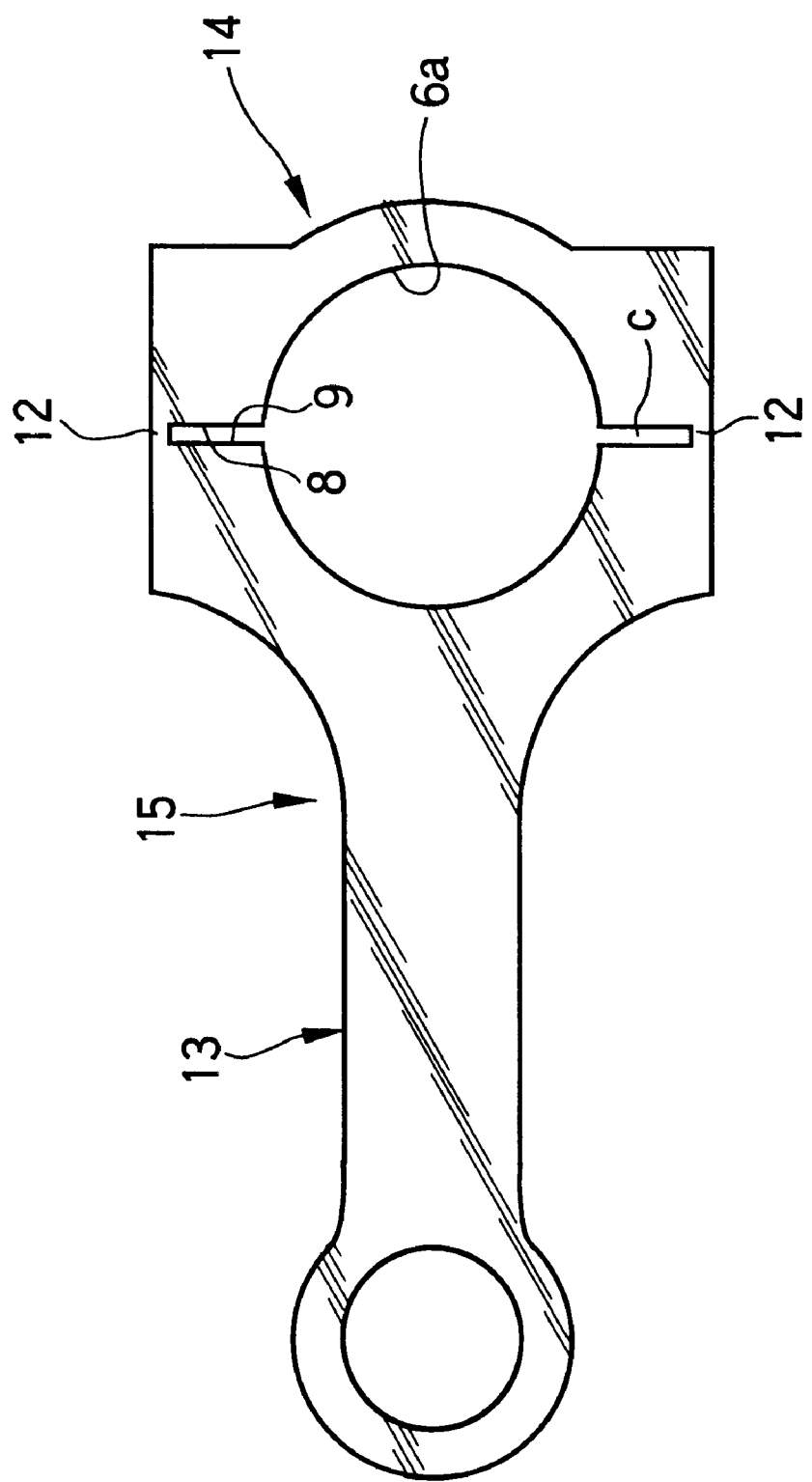
FIG. 3 is a plan view of a sintered product according to a first embodiment of the present invention.

By the above procedure, as shown in FIG. 3, there is produced a sintered product 15 including a first sintered portion 13 corresponding to the first green compact and a second sintered portion 14 corresponding to the second green compact which are bonded to each other through the stripe projections 12 and formed with a clearance c between each of the end faces 8 and 9.

Figure 4:
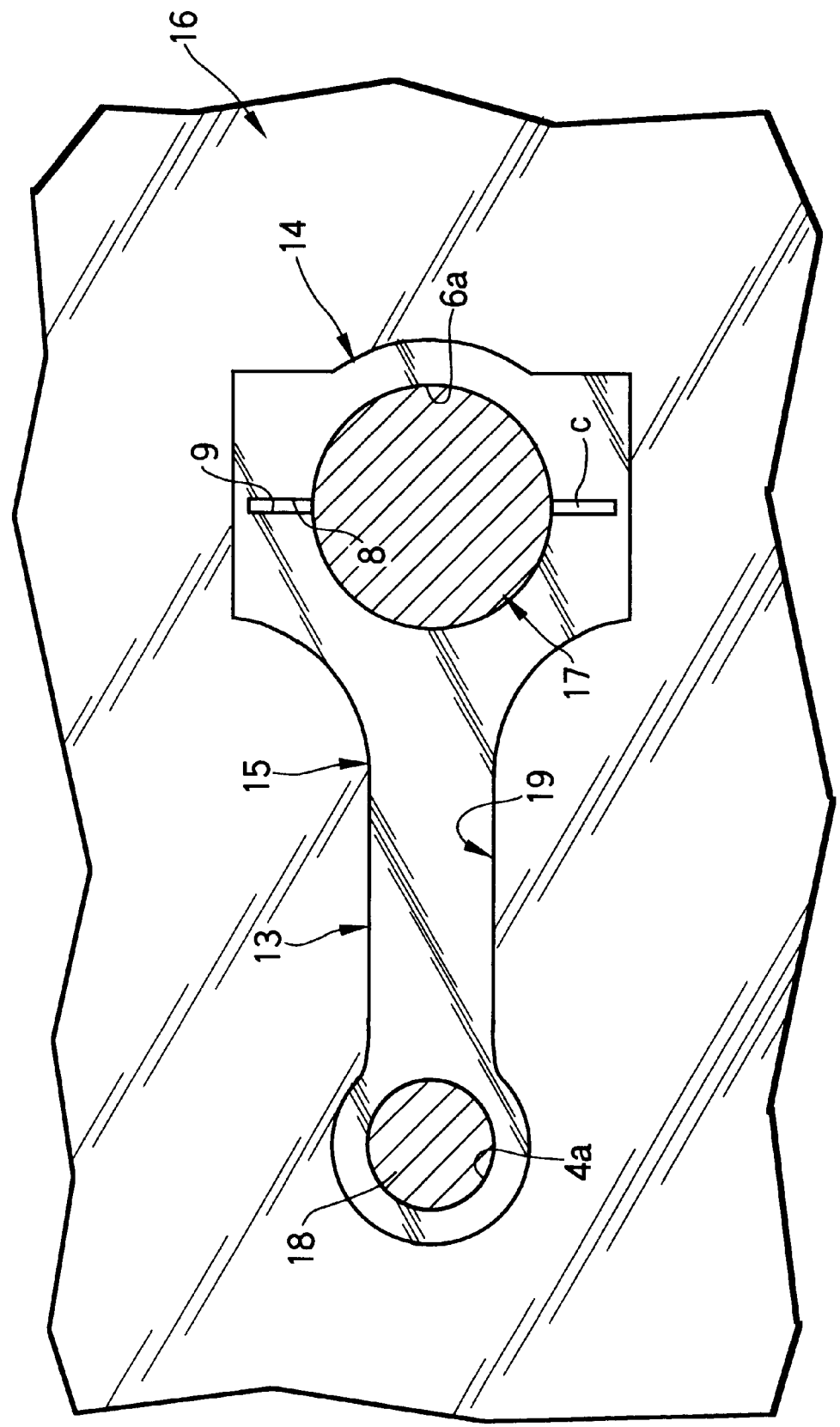
FIG. 4 is a plan view of the sintered product of the first embodiment placed in a forging lower metal mold.

(3) The sintered product 15 is heated and then, as shown in FIG. 4, a first core pin 17 of a lower metal mold 16 is inserted through the larger end hole 6a of the sintered product 15, a second core pin 18 is inserted through the smaller end hole 4a of the sintered product 15, and the sintered product 15 is placed in a cavity 19 of the lower metal mold 16. Thereafter, an upper metal mold (not shown) is lowered, and the sintered product 15 is subjected to a forging process to provide a forged product including the connecting rod body 5 corresponding to the first sintered portion 13 and the semi-annular cap 7 corresponding to the second sintered portion 14 which are connected to each other.

(4) The forged product is subjected to a fracture step, such as hammering a tapered pin into the larger end hole 6a, thereby providing the connecting rod body 5 and the semi-annular cap 7 which are fractured away from each other.

In the above procedure, the first and second sintered portions 13 and 14 constituting the sintered product 15 are integrally formed with each other through both the stripe projections 12 and therefore, the operability for mounting the sintered product 15 to the lower metal mold 16 becomes excellent.

Further, in the forging process, a material for the first sintered portion 13 plastically flows to the clearance c between each of the opposed circumferential end faces 8 and 9 of the first and second sintered portions 13 and 14, and at the same time, portions of the sintered product 15 around the clearances c are plastically deformed. In the meantime, although each of the stripe projections 12 is sintered to the first sintered portion 13, the sintered condition of each of the stripe projections 12 is not perfect and its deformability based on its original shape as the stripe projection 12 is not lost. Therefore, a tip end portion of each of the stripe projections 12 is slightly expanded toward the first sintered portion 13.

As a result, similar to the case shown in FIG. 1, the opposite circumferential end faces 9 and 8 of the larger end-forming semi-annular portion 3 and the semi-annular cap 7 which face each other are respectively formed, at regions in the vicinity of outer sides of the larger end-forming semi-annular portion 3 and the semi-annular cap 7, with a stripe recess and a stripe projection, and are formed, at regions thereof except the former regions, with a stripe recess and a stripe projection. The former stripe recess and the stripe projection fit to each other, and are larger than those of the prior art and thus have larger biting amounts. The latter stripe recess and the stripe projection fit to each other, and are larger than the former recess and projection and thus have larger biting amounts.

These recess and stripe projections are subjected to a fracture processing, and are fractured such as to be bisected into the stripe recesses $a_1$ and $b_1$, and the stripe projections $a_2$ and $b_2$.

With the above procedure, as described above, the larger end-forming semi-annular portion 3 and the semi-annular cap 7 can properly be aligned to each other, and it is possible to prevent both the members 7 and 3 from deviating from the correct positions.

A concrete example for producing the connecting rod 1 will be described below.

(1) Forming Process of Green Compact

Compositions of alloy powder includes 12% by weight of Si, 3% by weight of Cu, 0.5% by weight of Mg, 0.13% by weight of Ni and the balance Al; a lubricant ACRAWAX (made by LONZA Corp., trademark); and the density of each of the first and second green compacts is 2.25 g/cm$^3$.

(2) Sintering Process

Removing the lubricant at 400° C. for one hour; and sintering at 540° C. for one hour.

(3) Forging Process

Heating temperature of the sintered product is 400° C.; temperature of the metal mold is 400° C.; and compressive force is 400 MPa.

During the process for fitting the sintered product 15 into the cavity 19 of the lower metal mold 16, it is also possible to fracture the first and the second sintered portions 13 and 14 by cooperation of the upper metal mold and the first core pin 17. In this case, because the connecting portion between both the sintered portions 13 and 14 is located on the outer side edges of both the circumferential end faces 9 and 8, and there exists the clearance c leading to the larger end hole 6a between each of the circumferential end faces 9 and 8, the fracture can be conducted with a relatively small compressive force.

By using the above-described method, during the fracture processing, a connecting portion is not produced by sintering between the connecting rod body 5 and the semi-annular cap 7 and therefore, it is possible to largely reduce a force which is required for the fracture.

Figure 5A:
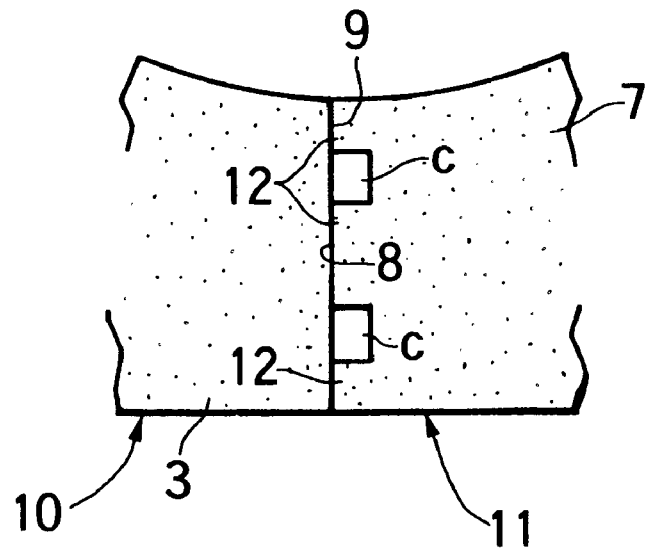
FIG. 5A is a plan view of an essential portion of first and second green compacts of a second embodiment of the present invention.

FIG. 5A shows a case in which each of the circumferential end faces 8 of the second green compact 11 is formed, at its inner edge, intermediate portion and outer edge, with stripe projections 12. In this case, both the circumferential end faces 9 of the first green compact are formed flatly.

Figure 5B:
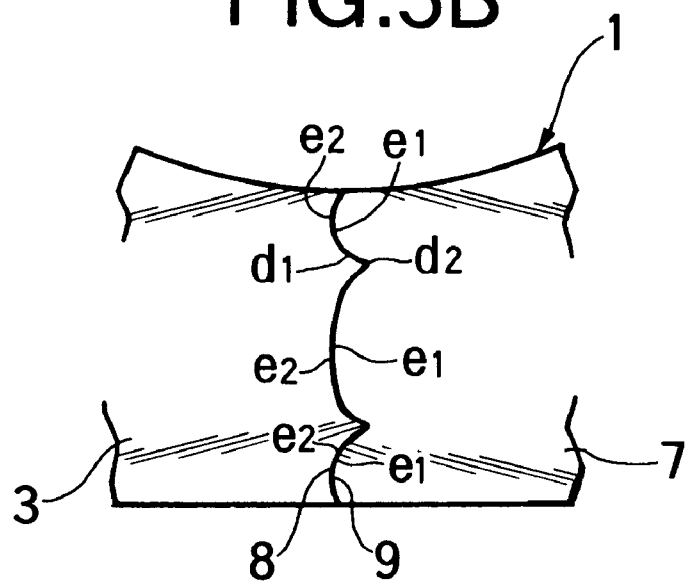
FIG. 5B is a plan view of an essential portion of a connecting rod.

If such first and second green compacts 10 and 11 are used, the opposite circumferential end faces 9 and 8 of the larger end-forming semi-annular portion 3 of the connecting rod 1 and the semi-annular cap 7 which face each other are formed with: two sharp stripe recesses and stripe projections $d_1$ and $d_2$ which fit to each other and which are large and thus have large biting amounts due to the two clearances c; and three gentle stripe recesses and stripe projections $e_1$ and $e_2$ which fit to each other and which are large and thus have large biting amounts due to the three stripe projections 12, as shown in FIG. 5B.

A shape of the cross-section of the stripe projection 12 is not limited, and may be, e.g., triangular or semicircular. The projection shape cross-section may be one in which a plurality of stripe projections each having triangular cross-section are arranged in parallel as a serration.

Figure 6:
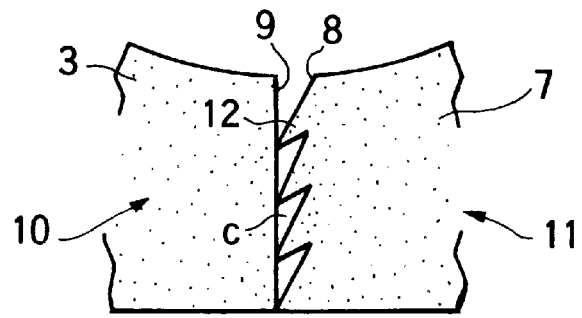
FIG. 6 is a plan view of an essential portion of first and second green compacts according to a third embodiment of the present invention.

FIG. 6 shows the stripe projections 12 having a serrated shape in cross-section. Portions of tip ends of the serrated stripe projections 12 which are connected by sintering are fractured by being deformed in a manner that each of the serrated stripe projections 12 except the outermost one are folded.

Figure 7:
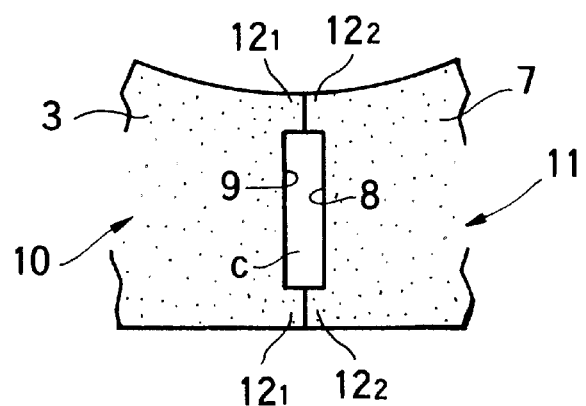
FIG. 7 is a plan view of an essential portion of first and second green compacts according to a fourth embodiment of the present invention.

FIG. 7 shows one example in which both the circumferential end faces 9 of the larger end-forming semi-annular portion 3 of the first green compact 10 and both the circumferential end faces 8 of the second green compact 11 have projections. Each of the circumferential end faces 8 and 9 includes a plurality of stripe projections parallel to the center line $L_1$ of the larger end hole (ion the present embodiment, two stripe projections $12_1$ and $12_2$ having a square cross section). The stripe projections $12_1$ and $12_2$ are located at inner and outer edges of each of the circumferential end faces 9 and 8, respectively. During the sintering process, each of the stripe projections $12_1$ of the circumferential end face 9 abuts against one of the stripe projections $12_2$ of the circumferential end face 8 to form clearances c between both the circumferential end faces 9 and 8. The projection may be one in which a plurality of stripe projections having triangular cross section are arranged in parallel as a separation on each of the circumferential end faces 8 and 9.

Figure 8:
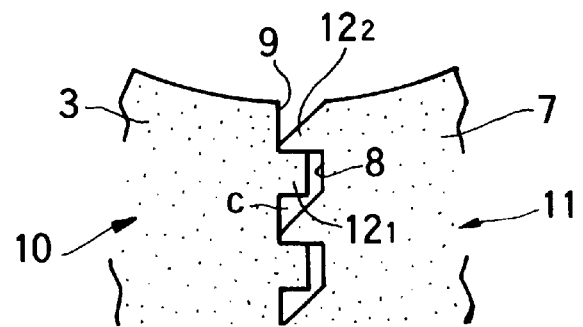
FIG. 8 is a plan view of an essential portion of first and second green compacts according to a fifth embodiment of the present invention.

FIG. 8 shows another example in which both the circumferential end faces 9 of the larger end-forming semi-annular portion 3 of the first green compact 10 and both the circumferential end faces 8 of the second green compact 11 have the above-described projections. The projections comprise a plurality of stripe projections $12_1$ and $12_2$ parallel to the center line $L_1$ of the larger end hole. Each of the two stripe projections $12_1$ of the first green compact 10 has a square cross section, and is located at an intermediate portion of each of the circumferential end faces 9. Each of the three stripe projections $12_2$ of the second green compact 11 has a triangular cross section, and is located at an inner edge, an intermediate portion and an outer edge of each of the circumferential end faces 8. During the sintering process, at least a part of the stripe projections existing on each of the circumferential end faces 8 (in the present embodiment, two stripe projections $12_2$ existing on an inner edge portion and an intermediate portion of the second green compact 11) is engaged with at least a part of the stripe projections $12_1$ existing on each of the circumferential end faces 9 (in the present embodiment, two stripe projections $12_1$ of the first green compact 10) to form a clearance c between both the circumferential end faces 9 and 8.

Figure 9B:
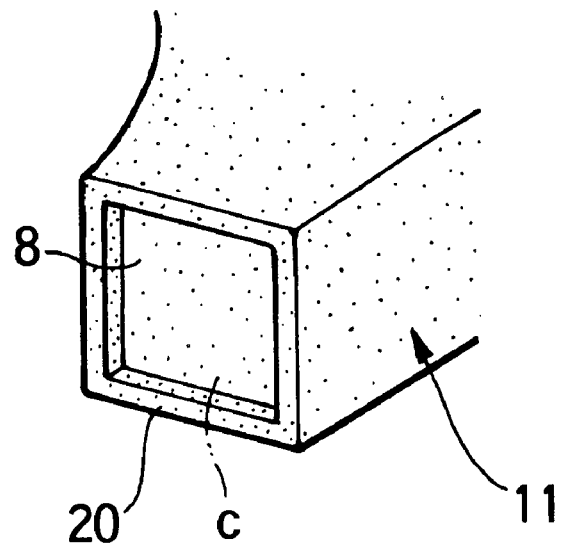
FIG. 9B is a transverse sectional view of an essential portion of a connecting rod.
Figure 9A:
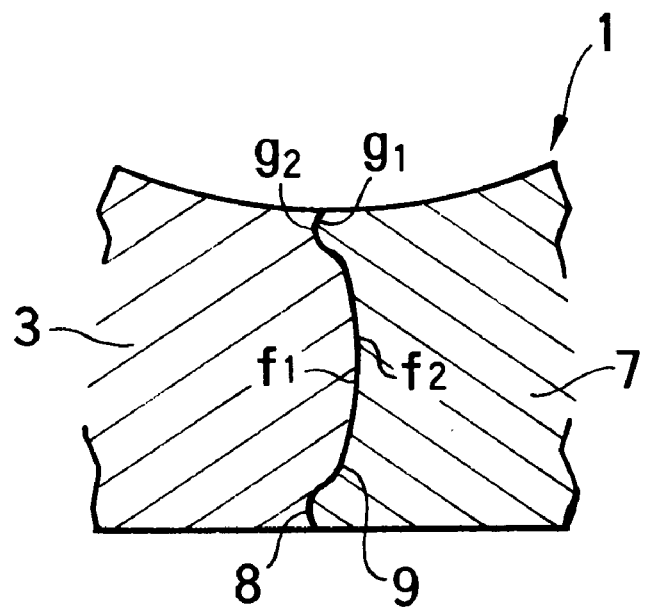
FIG. 9A is a perspective view of an essential portion of a second green compact according to a sixth embodiment of the present invention.

FIG. 9A shows an example in which a square frame-like projection 20 is formed on each of the circumferential end faces 8 of the second green compact 11 such as to extend along the entire outer edge of the end face 8. Each of the sides of the frame-like projection 20 is square in cross section. In this case, both the circumferential end faces 9 of the first green compact 10 are formed flatly.

If such first and second green compacts 10 and 11 are used, the opposite circumferential end faces 9 and 8 of the larger end-forming semi-annular portion 3 of the connecting rod 1 and the semi-annular cap 7 which face each other are formed with: recess and projection $f_1$ and $f_2$ which fit to each other and which are extremely large and thus have large biting amounts due to the clearance c formed by a space surrounded by the frame-like projection 20; and frame-like recess and projection $g_1$ and $g_2$ which fit to each other and which are large and thus have large biting amounts due to the frame-like projection 20, as shown in FIG. 9B.

Figure 10:
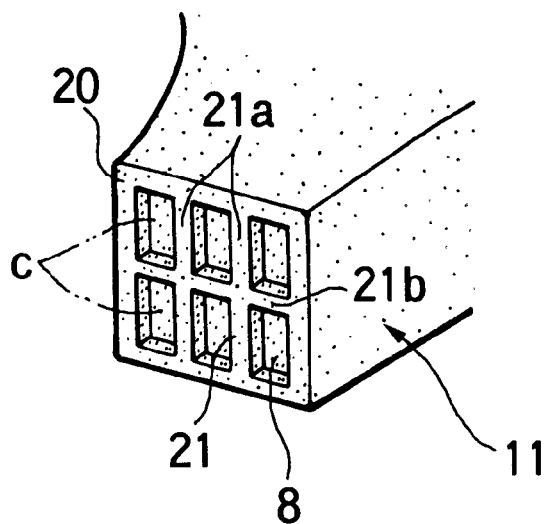
FIG. 10 is a perspective view of an essential portion of a second green compact according to a seventh embodiment of the present invention.

FIG. 10 shows an example in which the frame-like projection 20 is continuously formed with partitioning projections 21 so as to divide a space surrounded by the frame-like projection 20 in plural. Each of the projections 21 include two stripe projections 21a parallel to the center line $L_1$ of the larger end hole and a single stripe projection 21b perpendicular to both the stripe projections 21a. Each of the stripe projections 21a and 21b has a square cross section.

Figure 11:
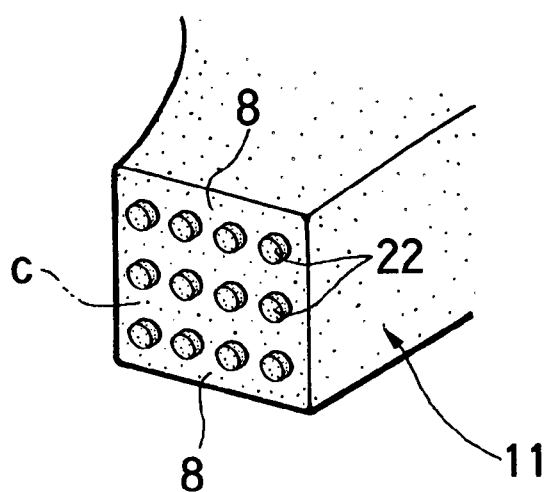
FIG. 11 is a perspective view of an essential portion of a second green compact according to an eighth embodiment of the present invention.

FIG. 11 shows an example in which both the circumferential end faces 8 of the second green compact 11 are formed with a plurality of circular projections 22 in a dispersed manner. During the sintering process, a space between the adjacent circular projections 22 forms a clearance c of the type described above. In this case, both the circumferential end faces 9 of the first green compact 10 are formed flatly.

Figure 12:
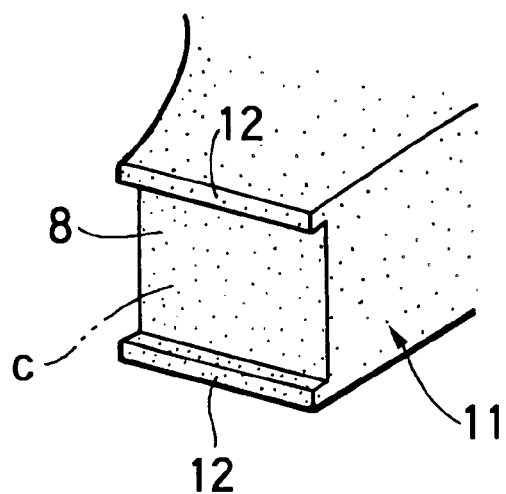
FIG. 12 is a perspective view of an essential portion of a second green compact according to a ninth embodiment of the present invention.

FIG. 12 shows an example in which at least one stripe projection 12 (two stripe projections 12 in the present embodiment) is formed on each of the circumferential end faces 8 of the second green compact 11. These stripe projections 12 extend in a direction perpendicular to the center line $L_1$ of the larger end hole. Both the stripe projections 12 have square cross sections, and are located on opposite outer edges of each of the circumferential end faces 8 in a direction of the center line $L_1$ of the larger end hole. During the sintering process, a space between both the stripe projections 12 forms a clearance c of the type described above. In this case, both the circumferential end faces 9 of the first green compact 10 are formed flatly.

Figure 13:
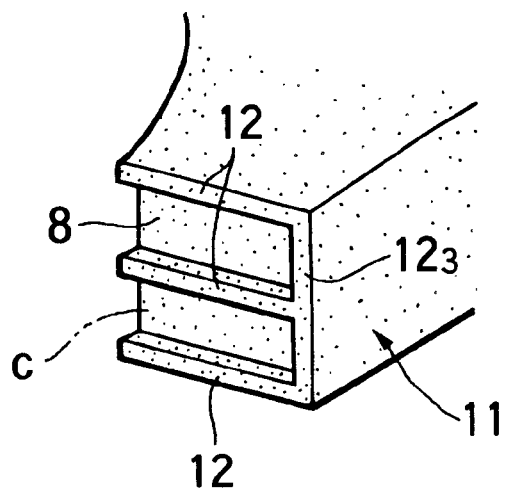
FIG. 13 is a perspective view of an essential portion of a second green compact according to a tenth embodiment of the present invention.

FIG. 13 shows a modification of the example shown in FIG. 12, in which a plurality of stripe projections extending in different directions are formed on each of the circumferential end faces 8 of the second green compact 11. These stripe projections include three stripe projections extending in a direction perpendicular to the center line $L_1$ of the larger end hole, and a single stripe projection $12_3$ parallel to the center line $L_1$ of the larger end hole. Each of the stripe projections 12 and $12_3$ has a square cross section. On each of the circumferential end faces 8, the three stripe projections 12 are respectively located at opposite outer side edges of the end face 8 and at a position bisecting the end face 8 in the direction of the center line $L_1$ of the larger end hole, and the single stripe projection $12_3$ is located at the outer side edge of the end face 8. The three stripe projections 12 and the single stripe projection $12_3$ are connected to each other. During the sintering process, a space between the stripe projections 12 and $12_3$ forms a clearance c of the type described above. In this case, both the circumferential end faces 9 of the first green compact 10 are formed flatly.

Figure 14:
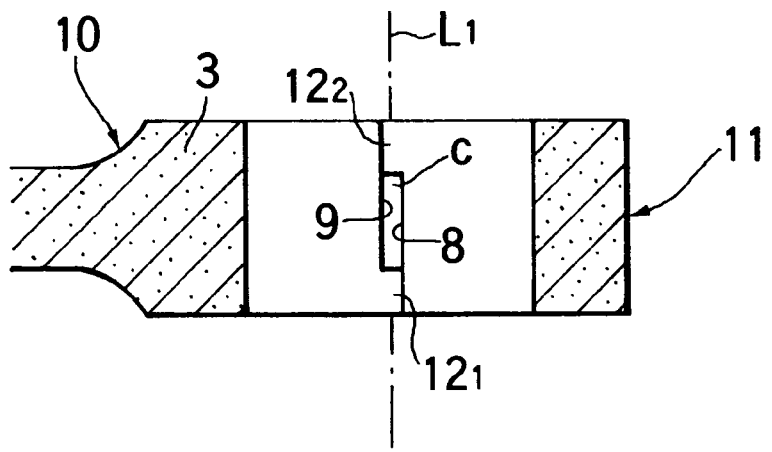
FIG. 14 is a longitudinal sectional side view of first and second green compacts according to an eleventh embodiment of the present invention.

FIG. 14 shows another example in which both the circumferential end faces 9 of the larger end-forming semi-annular portion 3 of the first green compact 10 and both the circumferential end faces 8 of the second green compact 11 have projections. The projection is at least one stripe projection (in the present embodiment, a single stripe projection $12_1$ and $12_2$ having a square cross section) extending on each of the circumferential end faces 9 and 8 in a direction perpendicular to the center line $L_1$ of the larger end hole. The stripe projection $12_1$ of the first green compact 10 is located at one end edge of each of the circumferential end faces 9 in the direction of the center line $L_1$ of the larger end hole, and the stripe projection $12_2$ of the second green compact 11 is located at the other end edge of each of the circumferential end faces 8 in the direction of the center line $L_1$ of the larger end hole. During the sintering process, the stripe projection $12_1$ existing on the circumferential end face 9 abuts against the one edge of the circumferential end face 8, while the stripe projection $12_2$ existing on the other end edge of the end face 8 abuts against the other end edge of the end face 9, thereby forming a clearance between both the circumferential end faces 9 and 8.

Figure 15:
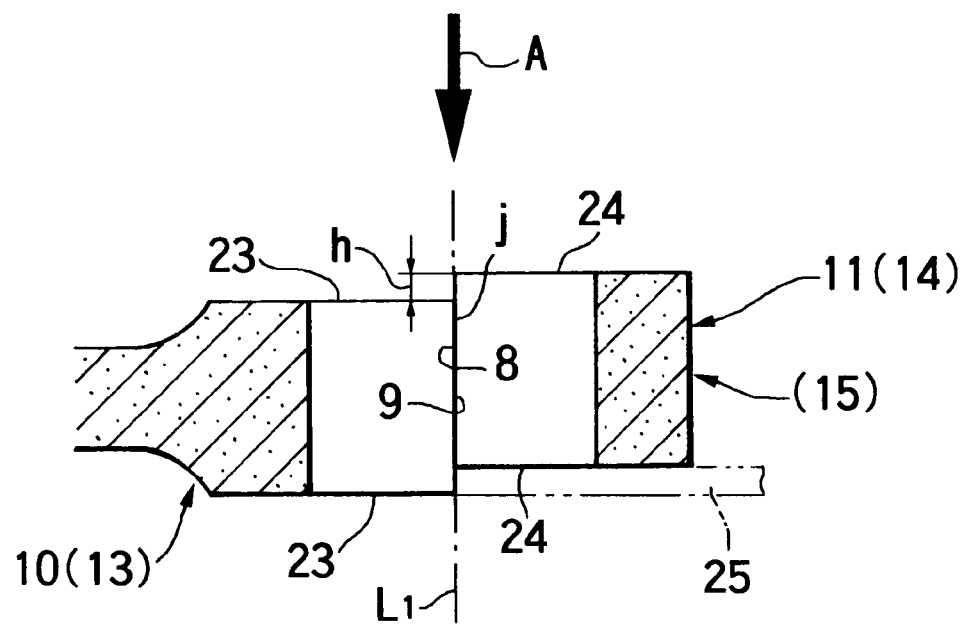
FIG. 15 is a longitudinal sectional side view of first and second green compacts according to a twelfth embodiment of the present invention.

In FIG. 15, both the circumferential end faces 9 and 8 of the first and second green compacts 10 and 11 are formed flatly. When the sintering process is conducted, both the circumferential end faces 9 and 8 are abutted against each other, and a difference (h) in height (which will be referred to as "height difference" hereinafter) is produced between adjacent semi-annular flat surfaces 23 and 24 which are intersecting in a plane parallel to the center line $L_1$ of the larger end hole. Such a height difference h is produced by placing a plate member 25 under the semi-annular flat surface 24 located underneath of the second green compact 11.

In the mold-forging process, the sintered product 15 is pressed in the direction of the center line $L_1$ of the larger end hole as indicated by an arrow A to eliminate the height difference h. By doing this, the sintered portion j between both the circumferential end faces 9 and 8 of the first and second sintered portions 13 and 14 is fractured or deformed to produce a large stress and therefore, in the fracture process after the forging process, the connecting rod body 5 and the semi-annular cap 7 can easily be fractured.

Figure 16:
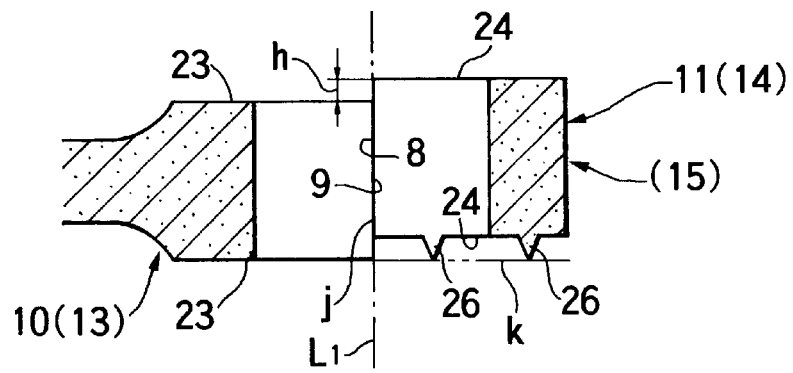
FIG. 16 is a longitudinal sectional side view of first and second green compacts according to a thirteenth embodiment of the present invention.

FIG. 16 shows a modification of the example shown in FIG. 15. In this modification, a plurality of leg pieces 26 having the same height as the height difference h are projectingly provided on one of the semi-annular flat surfaces 24 of the second green compact 11 which faces a phantom extending plane k of one of the semi-annular flat surfaces 23 of the first green compact 10. When such means are employed, the plate member 25 becomes unnecessary, and sintering operability becomes enhanced.

Figure 17:
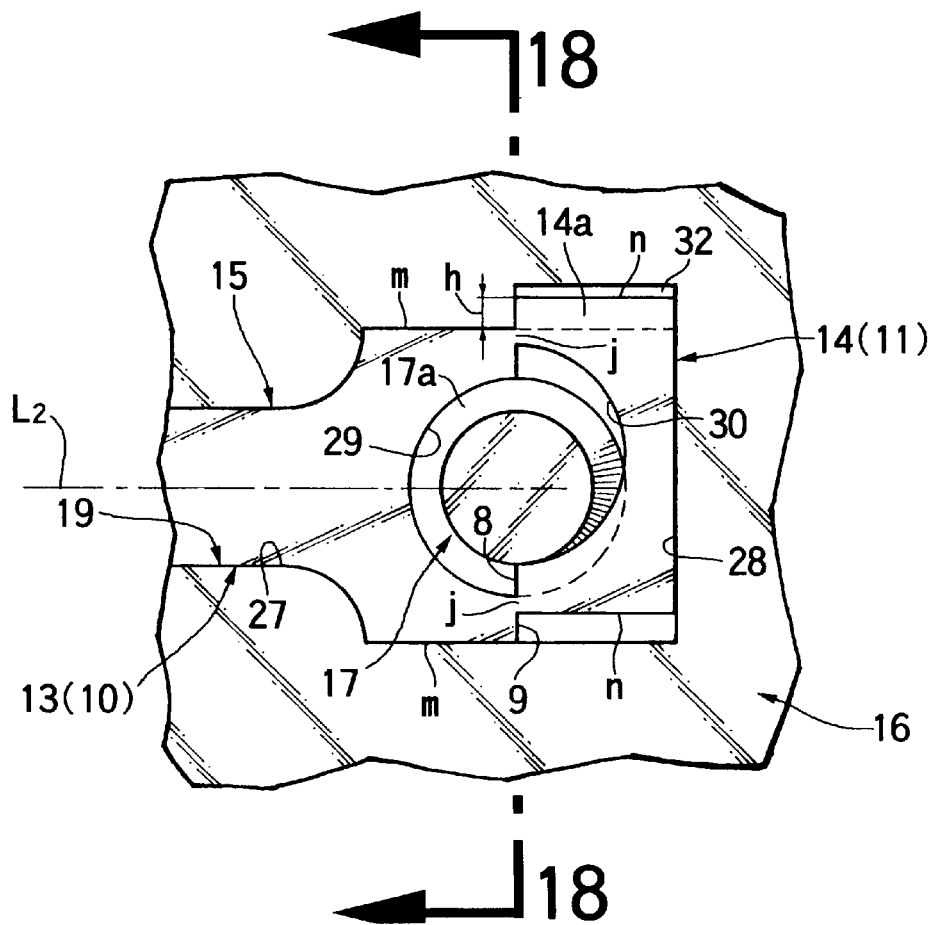
FIG. 17 is a plan view of an essential portion of a sintered product according to the present invention placed in a forging lower metal mold.

In FIG. 17, the sintered product 15 includes the first and second sintered portions 13 and 14. In this case, in the cavity 19 of the lower metal mold 16, the first and second green compacts 10 and 11 respectively have plane shapes substantially corresponding to those of a connecting rod body molding region 27 and a cap molding region 28. Therefore, a radius of each of semi-annular recesses 29 and 30 forming the larger end hole 6a is substantially equal to that of the first core pin 17. The first core pin 17 has a truncated conical tip end 17a.

When the sintering process is conducted, both the green compacts 10 and 11 are sintered in a state in which both the circumferential end faces 9 and 8 of both the green compacts 10 and 11 are abutted against each other, and the height difference h is produced between adjacent outer side surfaces m and n which are parallel to a rod axis $L_2$. By this operation, there is provided the sintered product 15 including the first and second sintered portions 13 and 14 connected to each other through both the circumferential end faces 9 and 8.

Figure 18:
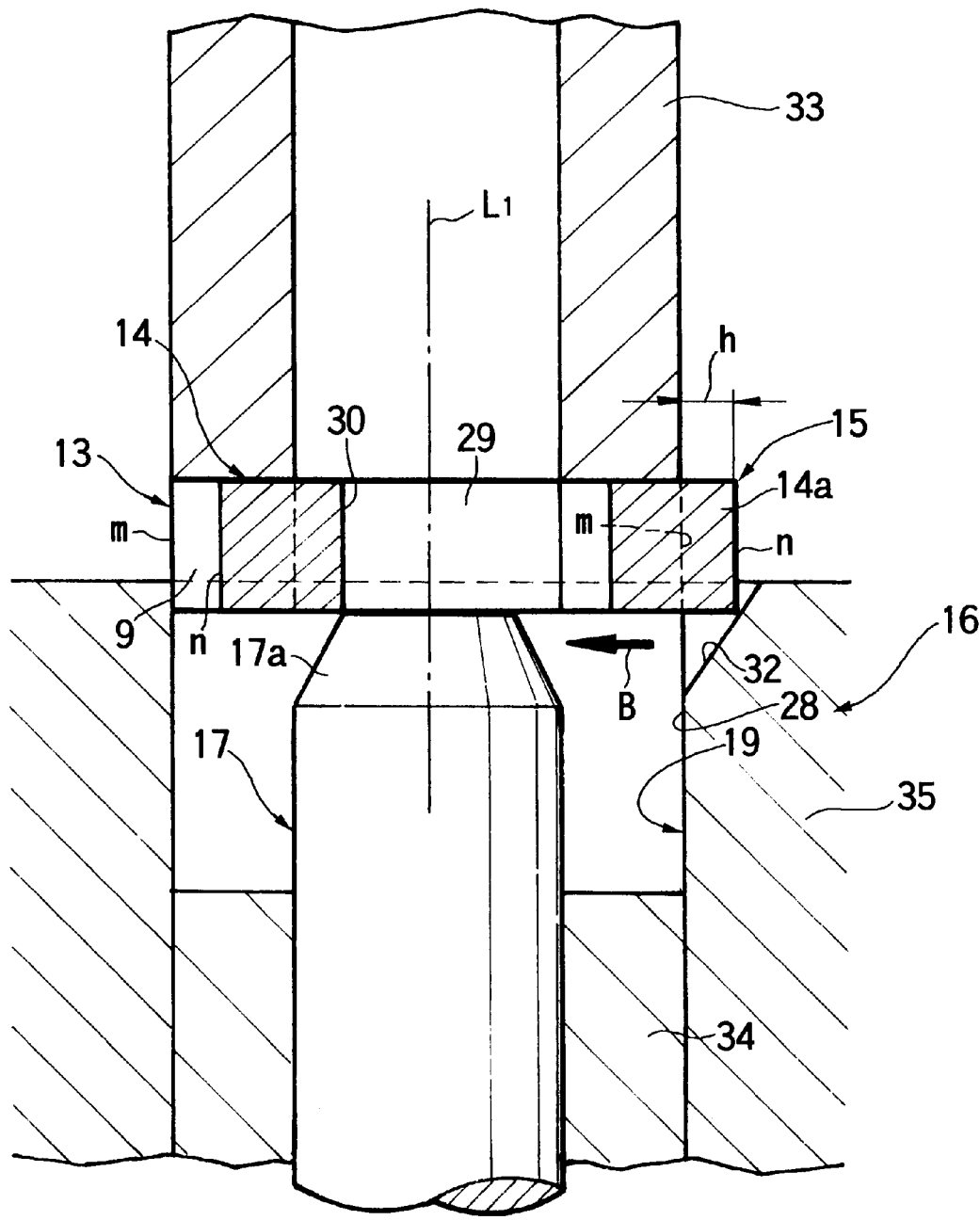
FIG. 18 is a sectional view of the sintered product and mold taken along the line 18—18 in FIG. 17.

In the forging process, the sintered product 15 is heated and then, the first sintered portion 13 of the sintered product 15 is fitted into an opening of the connecting rod body molding region 27 of the cavity 19 as shown in also FIG. 18. And a protrusion 14a of the second sintered portion 14 produced due to the height difference h is abutted against a slope 32 which is continuous with the cap molding region 28 of the cavity 19.

After that, at a stage of starting the forging process to lower the upper metal mold 33, at least one of the first and second sintered portions 13 and 14 (the second sintered portion 14 in the present embodiment) is moved in a direction B in a plane intersecting the center line $L_1$ of the larger end hole by cooperation between the slope 32 and a pressing force in a direction of the center line $L_1$ of the larger hole, thereby eliminating the height difference h.

By the above operation, a sintered portion j between both the circumferential end faces 9 and 8 of the first and second sintered portions 13 and 14 is fractured or deformed to produce a large stress. Therefore, in the fracture process after the forging process, it is possible to easily fracture the connecting rod body 5 and the semi-annular cap 7. In FIG. 18, the reference numeral 34 designates a movable metal mold which is slidably fitted to the lower metal mold body 35.

Figure 19:
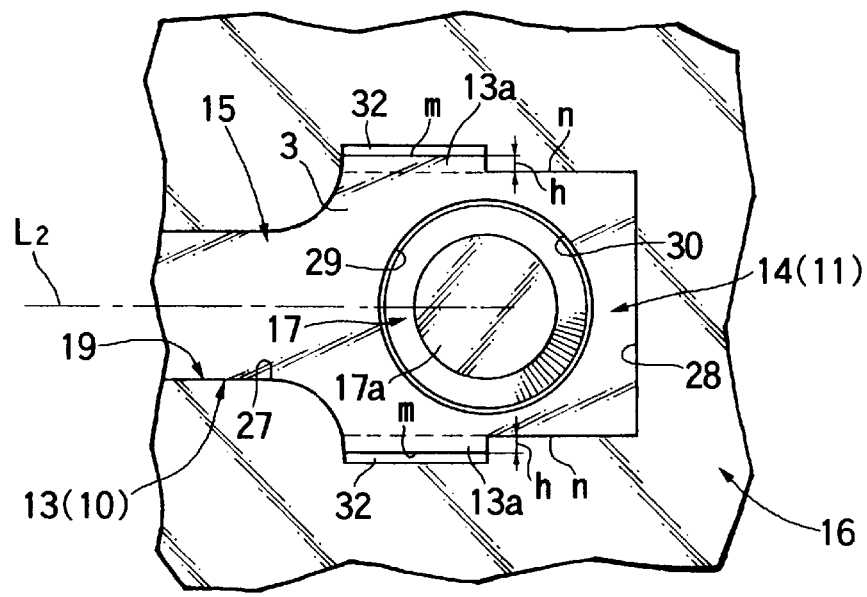
FIG. 19 is a plan view of an essential portion of a sintered product according to the present invention placed in a forging lower metal mold according to an embodiment of the present invention.

In FIG. 19, both the outer side edges parallel to the rod axis $L_2$ in the larger end-forming semi-annular portion 3 of the first green compact 10, i.e., of the first sintered portion 13 are protruded from the cavity 19 as protrusions 13a. In the lower metal mold 16, a pair of slopes 32 of the type described above are formed correspondingly to the protrusions 13a. The second green compact 11, i.e., the second sintered portion 14 has a plane shape substantially corresponding to the cap molding region 28 of the cavity 19. Radii of the semi-annular recesses 29 and 30 of the first and second sintered portions 13 and 14 are the same, and their centers are aligned to each other. Further, the radii are greater than the radius of the first core pin 17.

With this arrangement, the height difference h is produced between the pair of adjacent outer side surfaces m and n which are parallel to the larger end-forming semi-annular portion 3 of the first sintered portion 13 and the rod axis $L_2$ of the second sintered portion 14.

At a stage of starting the forging process, the first sintered portion 13 is plastically deformed in a plane intersecting the direction of the center line $L_1$ of the larger end hole by cooperation between both the slopes 32 and a pressing force in a direction of the center line $L_1$ of the larger end hole, thereby eliminating both the height differences h.

Figure 20:
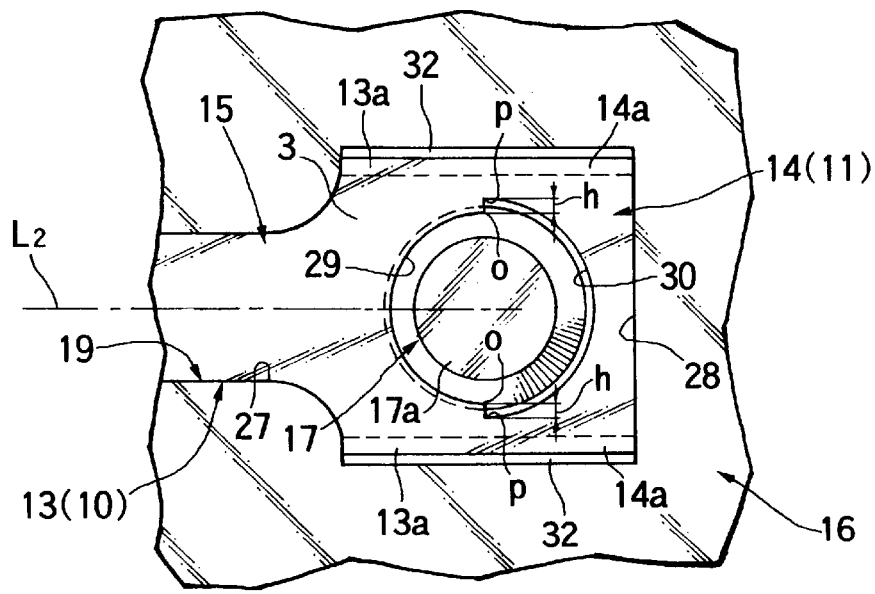
FIG. 20 is a plan view of an essential portion of a sintered product according to the present invention placed in a forging lower metal mold according to an embodiment of the present invention.

In FIG. 20, a radius of the semi-annular recess 29 of the first sintered portion 13 is smaller than a radius of the first core pin 17, and a radius of the semi-annular recess 30 of the second sintered portion 14 is larger than a radius of the first core pin 17. With this arrangement, a height difference h is produced between each of a pair of circumferential end edges o and p of both the semi-annular recesses 29 and 30. In this case, in the larger end-forming semi-annular portion 3 of the first sintered portion 13 and the second sintered portion 14, both the outer side edges which are in parallel to the rod axis $L_2$ are protruded from the cavity 19 as protrusions 13a and 14a. The lower metal mold 16 is formed with slopes 32 of the type described above correspondingly to the protrusions 13a and 14a.

At a stage of starting the forging process, the first and second sintered portions 13 and 14 are plastically deformed in a plane intersecting the direction of the center line $L_1$ of the larger end hole by cooperation of both the slopes 32, the first core pin 17 and a pressing force in a direction of the center line $L_1$ of the larger end hole, thereby eliminating both the height differences h.

Figure 21:
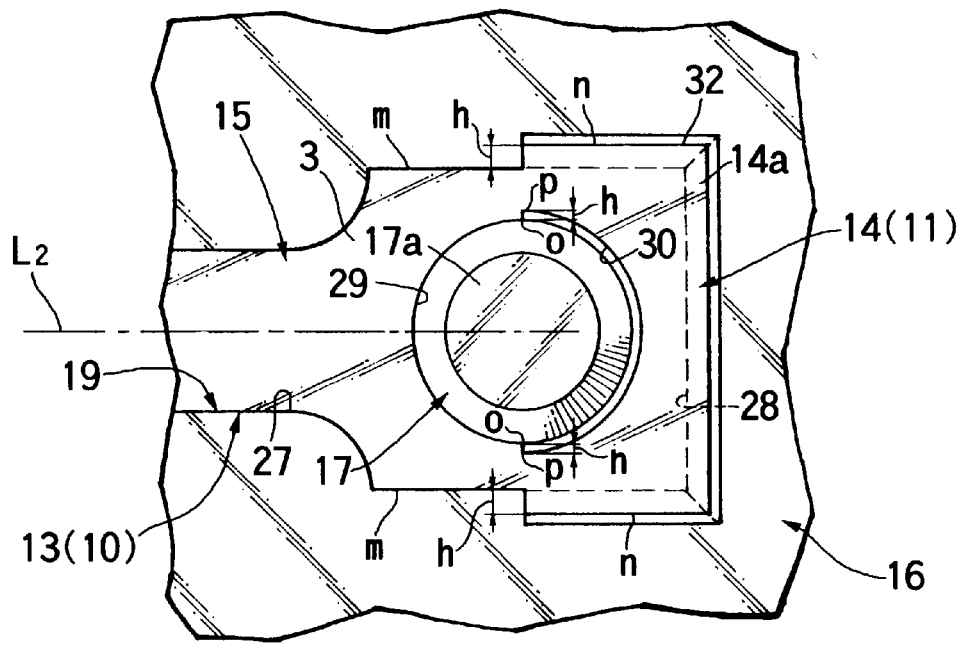
FIG. 21 is a plan view of an essential portion of a sintered product according to the present invention placed in a forging lower metal mold according to an embodiment of the present invention.

In FIG. 21, the first sintered portion 13 has a plane shape substantially corresponding to the connecting rod body molding region 27 of the cavity 19. Therefore, a radius of the semi-annular recess 29 of the first sintered portion 13 is substantially the same as a radius of the first core pin 17. Further, opposite outer side edges of the second sintered portion 14 which are in parallel to the rod axis $L_2$ and an outer side edge of the portion 14 intersecting the outer side edges are protruded from the cavity 19 as a U-shaped protrusion 14a. The lower metal mold 16 is formed with a slope 32 having a U-shaped plane of the type described above correspondingly to the U-shaped protrusion 14a. Further, a radius of the semi-annular recess 30 of the second sintered portion 14 is larger than a radius of the first core pin 17.

With this arrangement, each of the adjacent pair of outer sides m and n, and each of the pair of circumferential end edges o and p of both the semi-annular recesses 29 and 30 are in parallel to the rod axis $L_2$ of the larger end-forming semi-annular portion 3 of the first sintered portion 13 and the second sintered portion 14. And the height difference h is produced between each of the adjacent pair of outer sides m and n, and between each of the pair of circumferential end edges o and p.

At a stage of starting the forging process, the second sintered portion 14 is plastically deformed in a plane intersecting the direction of the center line $L_1$ of the larger end hole by cooperation of the slope 32 and a pressing force in a direction of the center line $L_1$ of the larger end hole, thereby eliminating both the height differences h.

Figure 22:
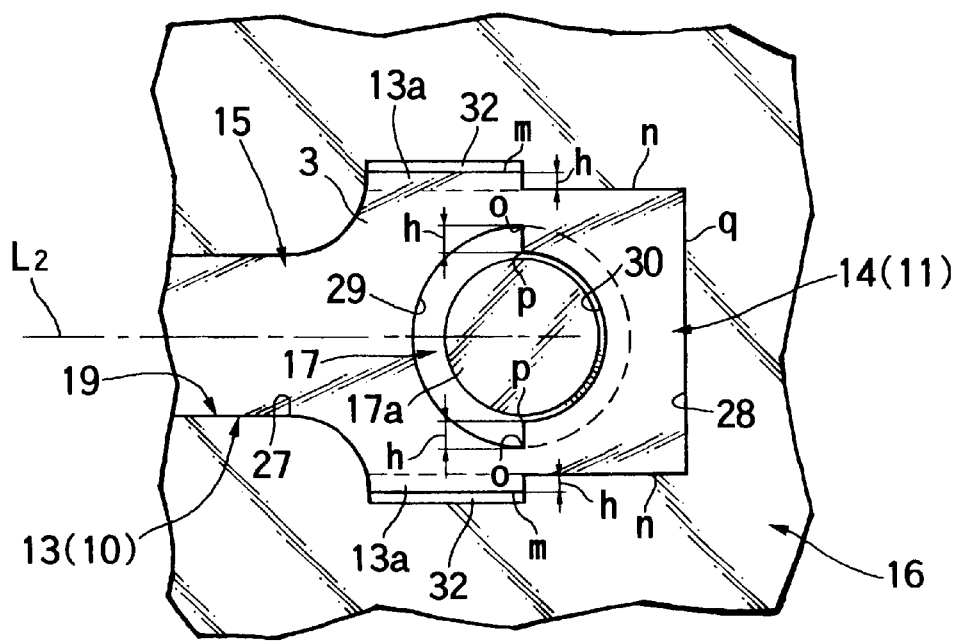
FIG. 22 is a plan view of an essential portion of a sintered product according to the present invention placed in a forging lower metal mold according to an embodiment of the present invention.

In FIG. 22, both of the outer side edges of the larger end-forming semi-annular portion 3 of the first sintered portion 13 which are in parallel to the rod axis $L_2$ are protruded from the cavity 19 as protrusions 13a. The lower metal mold 16 is formed with a pair of slopes 32 of the type described above correspondingly to the protrusions 13a. In the second sintered portion 14, a U-shaped outer side is formed by an outer side q and both outer sides n which are intersecting the outer side q and in parallel to the rod axis $L_2$. The U-shaped outer side substantially corresponds to a corresponding U-shaped inner side of the cap molding region 28. A radius of the semi-annular recess 29 of the first sintered portion 13 is substantially the same as a radius of the first core pin 17. On the other hand, a radius of the semi-annular recess 30 of the second sintered portion 14 is smaller than a radius of the first core pin 17.

With this arrangement, each of the adjacent pair of outer sides m and n, and each of the circumferential end edges o and p of both the semi-annular recesses 29 and 30 are in parallel to the larger end-forming semi-annular portion 3 of the first sintered portion 13 and the rod axis $L_2$ of the second sintered portion 14. And the height difference h is produced between each of the adjacent pair of outer sides m and n, and between each of the circumferential end edges o and p.

At a stage of starting the forging process, the first and second sintered portions 13 and 14 are plastically deformed in a plane intersecting the direction of the center line $L_1$ of the larger end hole by cooperation of the slopes 32, the first core pin 17 and a pressing force in a direction of the center line $L_1$ of the larger end hole, thereby eliminating both the height differences h.

In a plurality of sintered bodies 15 (the green compacts 10 and 11) each having the height difference h, it is possible to provide the stripe projection or the protrusion 12, $12_1$ to $12_2$, 20, 21 or 22 as shown in FIGS. 2, 5 to 14. By such an arrangement, at least one set of recess and projection $a_1$, $a_2$; $b_1$, $b_2$; $d_1$, $d_2$; $e_1$, $e_2$; $f_1$, $f_2$; and $g_1$, $g_2$ which are formed on the opposed circumferential end faces 9 and 8 of the larger end-forming semi-annular portion 3 and the semi-annular cap 7 and which fit to each other can be made relatively large, and their biting amounts can also be made large.

According to embodiments of the present invention, there is provided a process for producing a connecting rod in which the mounting operability of a sintered product to a metal mold is enhanced, and at least one set of a recess and a projection which are formed on the opposed circumferential ends of the larger end-forming semi-annular portion and the semi-annular cap and which are fitted to each other can be made relatively large, and their biting amounts can also be made large.

The larger end-forming semi-annular portion and the semi-annular cap obtained by the invention have excellent alignment properties, and a deviation of both these members from right positions can be avoided after alignment.

According to embodiments of the present invention, there is provided a process for producing a connecting rod in which the mounting operability of a sintered product to a metal mold is enhanced, and the fracture processability of the forged product is excellent.

The effects obtained by the various features described above can be combined by using any combinations of those features.

Although the methods and articles in accordance with the present invention have been described in connection with preferred embodiments, it will be appreciated by those skilled in the art that modifications not specifically described may be made without departing from the spirit and scope of the invention defined in the following claims.

We claim:

1. A process for producing a connecting rod, said connecting rod comprising a connecting rod body having a larger end-forming semi-annular portion, and a semi-annular cap, said larger end-forming semi-annular portion and said semi-annular cap together constituting a larger end portion, said semi-annular cap having two circumferential end faces of said cap, said circumferential end faces of said cap being in contact with two circumferential end faces of said larger end-forming semi-annular portion, said process comprising:

forming a first green compact having a shape similar to a shape of said connecting rod body, including two circumferential end faces of said first green compact;

forming a second green compact having a shape similar to a shape of said semi-annular cap, including two circumferential end faces of said second green compact, at least one projection being present on each of the circumferential end faces of at least one of said first green compact and said second green compact;

positioning said at least one projection in contact with a circumferential end face of the other of said first green compact and said second green compact;

sintering said first and second green compacts, thereby providing a sintered product comprising a first sintered portion corresponding to said first green compact and a second sintered portion corresponding to said second green compact, said first and second sintered portions being connected to each other through said at least one projection and formed with a clearance between said circumferential end faces of said second green compact and said circumferential end faces of said first green compact;

mold-forging said sintered product to provide a forged product comprising said connecting rod body corresponding to said first sintered portion and said semi-annular cap corresponding to said second sintered portion, said connecting rod body and said semi-annular cap being connected to each other.

2. A process for producing a connecting rod as recited in claim 1, wherein said larger end portion defines a larger end hole having a center line extending along an axis of said larger end hole, and wherein said circumferential end faces of one of said first green compact and said second green compact are flat surfaces, and said circumferential end faces of the other of said first green compact and said second green compact each comprise at least one projection, said at least one projection being a stripe projection parallel to said center line of said larger end hole.

3. A process for producing a connecting rod as recited in claim 1, wherein said larger end portion defines a larger end hole having a center line extending along an axis of said larger end hole, and wherein said circumferential end faces of said first green compact and said circumferential end faces of said second green compact each comprise a projection pattern, said projection pattern being a plurality of stripe projections parallel to said center of said larger end hole, and wherein during said sintering process, each of said stripe projections existing on said circumferential end faces of said first green compact is in contact with one of said stripe projections existing on said circumferential end faces of said second green compact.

4. A process for producing a connecting rod as recited in claim 1, wherein said larger end portion defines a larger end hole having a center line extending along an axis of said larger end hole, and wherein said circumferential end faces of said first green compact and said circumferential end faces of said second green compact each comprise projection pattern, said projection pattern being a plurality of stripe projections parallel to said center line of said larger end hole, and wherein during said sintering process, at least a part of said stripe projections existing on said circumferential end faces of said first green compact are engaged with at least a part of said stripe projections existing on said circumferential end faces of said second green compact.

5. A process for producing a connecting rod as recited in claim 1, wherein said circumferential end faces of one of said first green compact and said circumferential end face of said second green compact are flat surfaces, and said circumferential end faces of the other of said first green compact and said second green compact each comprise at least one projection, said at least one projection being a frame-like projection.

6. A process for producing a connecting rod as recited in claim 5, wherein said frame-like projection is provided with a partitioning projection which partitions a space surrounded by said frame-like projection into a plurality of sub-spaces.

7. The process for producing a connecting rod as recited in claim 6 wherein the frame-like projection is frame shaped and surrounds an outer circumference of said circumferential end face.

8. A process for producing a connecting rod as recited in claim 1, wherein said circumferential end faces of one of said first green compact and said second green compact are flat surfaces, and said circumferential end faces of the other of said first green compact and said second green compact each comprise projection pattern, said projection pattern being a plurality of protrusions dispersed on said circumferential end faces of said other of said first green compact and said second green compact.

9. A process for producing a connecting rod as recited in claim 1, wherein said larger end portion defines a larger end hole having a center line extending along an axis of said larger end hole, and wherein said circumferential end faces of one of said first green compact and said second green compact are flat surfaces, and said circumferential end faces of the other of said first green compact and said second green compact each comprise at least one projection, said at least one projection being a stripe projection extending in a direction intersecting said center line of the larger end hole.

10. A process for producing a connecting rod as recited in claim 1, wherein said larger end portion defines a larger end hole having a center line extending along an axis of said larger end hole, and wherein said circumferential end faces of one of said first green compact and said second green compact are flat surfaces, and said circumferential end faces of the other of said first green compact and said second green compact each comprise projection pattern, said projection pattern including at least one stripe projection extending in a direction intersecting said center line and at least one stripe projection parallel to said center line.

11. A process for producing a connecting rod as recited in claim 1, further comprising fracturing said forged product to provide said connecting rod body and said semi-annular cap separate from each other.

12. A process for producing a connecting rod as recited in claim 1, wherein said larger end portion defined a larger end hole having a center line extending along an axis of said larger end hole, and wherein said circumferential end faces of said first green compact and said circumferential end faces of said second green compact each includes a projection pattern, said projection pattern including at least one stripe projection extending in a direction intersecting said center line, and wherein during said sintering process, said at least one stripe projection on one of said circumferential end faces of said first green compact is in contact with one of said circumferential end faces of said second green compact, and said at least one stripe projection on one of said circumferential end faces of said second green compact is in contact with one of said circumferential end faces of said first green compact.

13. A process for producing a connecting rod, said connecting rod comprising a connecting rod body having a larger end-forming semi-annular portion, and a semi-annular cap, said larger end-forming semi-annular portion and said semi-annular cap together constituting a larger end portion, said larger end portion defining a larger end hole having a center line extending along an axis of said larger end hole, said semi-annular cap having two circumferential end faces of said cap, said circumferential end faces of said cap being in contact with two circumferential end faces of said larger end-forming semi-annular portion, said process comprising:

forming a first green compact having a shape similar to a shape of said connecting rod body, including two circumferential end faces of said first green compact;

forming a second green compact having a shape similar to a shape of said semi-annular cap, including two circumferential end faces of said second green compact;

positioning each of said circumferential end faces of said first green compact in contact with each of said circumferential end faces of said second green compact and offset with respect to said circumferential end faces of the one of said first green compact and said second green compact by an offset distance along a direction parallel to said center line;

sintering said first and second green compacts, thereby providing a sintered product comprising a first sintered portion corresponding to said first green compact and a second sintered portion corresponding to said second green compact, said first and second sintered portions being connected to each other through said circumferential end faces of said first and second green compacts;

mold-forging said sintered product by pressing said sintered product in a direction of said center line to eliminate said offset distance to provide a forged product comprising said connecting rod body corresponding to said first sintered portion and said semi-annular cap corresponding to said second sintered portion.

14. A process for producing a connecting rod as recited in claim 13, wherein a semi-annular plane of said second green compact which faces a phantom extending surface of a semi-annular plane of said first green compact is provided with a plurality of leg pieces having a height equal to said offset distance.

15. A process for producing a connecting rod as recited in claim 13 or 14, wherein said circumferential end faces of one of said first green compact and said second green compact are each provided with at least one projection which is connected to a circumferential end face of the other of said first green compact and said second green compact during said sintering process and which forms a clearance between said circumferential end faces of said first and second green compacts.

16. A process for producing a connecting rod as recited in claim 15, wherein said larger end portion defines a larger end hole having a center line extending along an axis of said larger end hole, and wherein said circumferential end faces of one of said first green compact and said second green compact are flat surfaces, and said circumferential end faces of the other of said first green compact and said second green compact each comprise at least one projection, said at least one projection being a stripe projection parallel to said center line.

17. A process for producing a connecting rod as recited in claim 15, wherein said larger end portion defines a larger end hole having a center line extending along an axis of said larger end hole, and wherein said circumferential end faces of said first green compact and said circumferential end faces of said second green compact each comprise projection pattern, said projection pattern being a plurality of stripe projections parallel to said center line of said larger end hole, and wherein during said sintering process, each of said stripe projections existing on said circumferential end faces of said first green compact is in contact with one of said stripe projections existing on said circumferential end faces of said second green compact.

18. A process for producing a connecting rod as recited in claim 15, wherein said larger end portion defines a larger end hole having a center line extending along an axis of said larger end hole, and wherein said circumferential end faces of said first green compact and said circumferential end faces of said second green compact each comprise projection pattern, said projection pattern being a plurality of stripe projections parallel to said center line of said larger end hole, and wherein during said sintering process, at least a part of said stripe projections existing on said circumferential end faces of said first green compact is in contact with at least a part of said stripe projections existing on said circumferential end faces of said second green compact.

19. A process for producing a connecting rod as recited in claim 15, wherein said circumferential end faces of one of said first green compact and said circumferential end faces of said second green compact are flat surfaces, and said circumferential end faces of the other of said first green compact and said second green compact each comprise at least one projection, said at least one projection being a frame-like projection.

20. A process for producing a connecting rod as recited in claim 19, wherein said frame-like projection is provided with a partitioning projection which partitions a space surrounded by said frame-like projection into a plurality of sub-spaces.

21. The process for producing a connecting rod as recited in claim 20 wherein the frame-like projection is frame shaped and surrounds an outer circumference of said circumferential end face.

22. A process for producing a connecting rod as recited in claim 15, wherein said circumferential end faces of one of said first green compact and said second green compact are flat surfaces, and said circumferential end faces of the other of said first green compact and said second green compact each comprise projection pattern, said projection pattern being a plurality of protrusions dispersed on said circumferential end faces of said other of said first green compact and said second green compact.

23. A process for producing a connecting rod as recited in claim 15, wherein said larger end portion defines a larger end hole having a center line extending along an axis of said larger end hole, and wherein said circumferential end faces of one of said first green compact and said second green compact are flat surfaces, and said circumferential end faces of the other of said first green compact and said second green compact each comprise at least one projection, said at least one projection being a stripe projection extending in a direction intersecting said center line.

24. A process for producing a connecting rod as recited in claim 15, wherein said larger end portion defines a larger end hole having a center line extending along an axis of said larger end hole, and wherein said circumferential end faces of one of said first green compact and said second green compact are flat surfaces, and said circumferential end faces of the other of said first green compact and said second green compact each comprise projection pattern, said projection pattern including at least one stripe projection extending in a direction intersecting said center line and at least one stripe projection parallel to said center line.

25. A process for producing a connecting rod as recited in claim 13, further comprising fracturing said forged product to provide said connecting rod body and said semi-annular cap separate from each other.

26. A process for producing a connecting rod as recited in claim 15, wherein said larger end portion defines a larger end hole having a center line extending along an axis of said larger end hole, and wherein said circumferential end faces of said first green compact and said circumferential end faces of said second green compact each includes a projection pattern, said projection pattern including at least one stripe projection extending in a direction intersecting said center line, and wherein during said sintering process, said at least one stripe projection on one of said circumferential end faces of said first green compact is in contact with one of said circumferential end faces of said second green compact, and said at least one stripe projection on one of said circumferential end faces of said second green compact is in contact with one of said circumferential end faces of said first green compact.

27. A process for producing a connecting rod, said connecting rod comprising a semi-annular cap, and a connecting rod body, said connecting rod body having a rod portion and a larger end-forming semi-annular portion integral with said rod portion, said rod portion having a rod axis, said larger end-forming semi-annular portion and said semi-annular cap together constituting a larger end portion, said larger end portion defining a larger end hole having a center line defining an axis of said larger end hole, said semi-annular cap having two circumferential end faces of said cap, said cap circumferential end faces of said cap being in contact with two circumferential end faces of said larger end-forming semi-annular portion, said process comprising:

forming a first green compact having a shape similar to a shape of said connecting rod body, including two circumferential end faces of said first green compact, a semi-annular circumferential end edge of said first green compact, and outer sides of said first green compact which are parallel to said rod axis;

forming a second green compact having a shape similar to a shape of said semi-annular cap, including two circumferential end faces of said second green compact, a semi-annular circumferential end edge of said second green compact, and outer sides of said second green compact which are parallel to said rod axis;

positioning said first and second green compacts in at least one of a state 1) where said circumferential end faces of said first green compact are in contact with said circumferential end faces of said second green compact, with a height difference between said outer sides of said first and second green compacts which are adjacent to each other, and a state 2) where said circumferential end faces of said first green compact are in contact with said circumferential end faces of said second green compact, with a height difference between said semi-annular circumferential end edge of said first green compact and said semi-annular circumferential end edge of said second green compact based on a difference in radius between said semi-annular circumferential end edge of said first green compact and said semi-annular circumferential end edge of said second green compact;

sintering said first and second green compacts, thereby providing a sintered product comprising a first sintered portion corresponding to said first green compact and a second sintered portion corresponding to said second green compact;

mold-forging said sintered product by pressing said sintered product in a direction parallel to said center line;

moving and/or plastically deforming at least one of said first and second sintered portions in a plane intersecting said center line by cooperation of a mold and a pressing force in the direction of said center line, thereby eliminating said height difference between outer sides and/or said height difference between said semi-annular circumferential end edges, and providing a forged product in which said first sintered portion and said second sintered portion are interconnected with each other.

28. A process for producing a connecting rod as recited in claim 27, wherein said circumferential end faces of one of said first green compact and said second green compact are each provided with at least one projection which is connected to a circumferential end face of the other of said first green compact and said second green compact during said sintering process and which forms a clearance between said circumferential end faces of said first and second green compacts.

29. A process for producing a connecting rod as recited in claim 27, wherein said larger end portion defines a larger end hole having a center line extending along an axis of said larger end hole, and wherein said circumferential end faces of one of said first green compact and said second green compact are flat surfaces, and said circumferential end faces of the other of said first green compact and said second green compact each comprise at least one projection, said at least one projection being a stripe projection parallel to said center line.

30. A process for producing a connecting rod as recited in claim 27, wherein said larger end portion defines a larger end hole having a center line extending along an axis of said larger end hole, and wherein said circumferential end faces of said first green compact and said circumferential end faces of said second green compact each comprise projection pattern, said projection pattern being a plurality of stripe projections parallel to said center line of said larger end hole, and wherein during said sintering process, each of said stripe projections existing on said circumferential end faces of said first green compact is in contact with one of said stripe projections existing on said circumferential end faces of said second green compact.

31. A process for producing a connecting rod as recited in claim 27, wherein said larger end portion defines a larger end hole having a center line extending along an axis of said larger end hole, and wherein said circumferential end faces of said first green compact and said circumferential end faces of said second green compact each comprise projection pattern, said projection pattern being a plurality of stripe projections parallel to said center line of said larger end hole, and wherein during said sintering process, at least a part of said stripe projections existing on said circumferential end faces of said first green compact is engaged with at least a part of said stripe projections existing on said circumferential end faces of said second green compact.

32. A process for producing a connecting rod as recited in claim 27, wherein said circumferential end faces of one of said first green compact and said circumferential end faces of said second green compact are flat surfaces, and said circumferential end faces of the other of said first green compact and said second green compact each comprise at least one projection, said at least one projection being a frame-like projection.

33. A process for producing a connecting rod as recited in claim 32, wherein said frame-like projection is provided with a partitioning projection which partitions a space surrounded by said frame-like projection in a plurality of sub-spaces.

34. The process of producing a connecting rod as recited in claim 33 wherein the frame-like projection is frame shaped and surrounds an outer circumference of said circumferential end face.

35. A process for producing a connecting rod as recited in claim 27, wherein said circumferential end faces of one of said first green compact and said second green compact are flat surfaces, and said circumferential end faces of the other of said first green compact and said second green compact each comprise projection pattern, said projection pattern being a plurality of protrusions dispersed on said circumferential end faces of said other of said first green compact and said second green compact.

36. A process for producing a connecting rod as recited in claim 27, wherein said larger end portion defines a larger end hole having a center line extending along an axis of said larger end hole, and wherein said circumferential end faces of one of said first green compact and said second green compact are flat surfaces, and said circumferential end faces of the other of said first green compact and said second green compact each comprise at least one projection, said at least one projection being a stripe projection extending in a direction intersecting said center line.

37. A process for producing a connecting rod as recited in claim 27, wherein said larger end portion defines a larger end hole having a center line extending along an axis of said larger end hole, and wherein said circumferential end faces of one of said first green compact and said second green compact are flat surfaces, and said circumferential end faces of the other of said first green compact and said second green compact each comprise projection pattern, said projection pattern including at least one stripe projection extending in a direction intersecting said center line and at least one stripe projection parallel to said center line.

38. A process for producing a connecting rod as recited in claim 27, further comprising fracturing said forged product to provide said connecting rod body and said semi-annular cap separate from each other.

39. A process for producing a connecting rod as recited in claim 27, wherein said larger end portion defines a larger end hole having a center line extending along an axis of said larger end hole, and wherein said circumferential end faces of said first green compact and said circumferential end faces of said second green compact each includes a projection pattern, said projection pattern including at least one stripe projection extending in a direction intersecting said center line, and wherein during said sintering process, said at least one stripe projection on one of said circumferential end faces of said first green compact is in contact with one of said circumferential end faces of said second green compact, and said at least one stripe projection on one of said circumferential end faces of said second green compact is in contact with one of said circumferential end faces of said first green compact.

* * * * *